United States Patent
Tanaka et al.

(10) Patent No.: US 11,962,583 B2
(45) Date of Patent: Apr. 16, 2024

(54) AUTHENTICATION SYSTEM USING ACCESS POINT DEVICE AND AUTHENTICATION SERVER TO HANDLE A DEVICE'S NETWORK ACCESS AUTHENTICATION REQUEST

(71) Applicant: KABUSHIKI KAISHA TOSHIBA, Tokyo (JP)

(72) Inventors: Yasuyuki Tanaka, Kawasaki Kanagawa (JP); Toshio Ito, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 324 days.

(21) Appl. No.: 17/672,327

(22) Filed: Feb. 15, 2022

(65) Prior Publication Data

US 2023/0006995 A1    Jan. 5, 2023

(30) Foreign Application Priority Data

Jul. 5, 2021   (JP) .................. 2021-111430

(51) Int. Cl.
*H04L 9/40*   (2022.01)
(52) U.S. Cl.
CPC ........ *H04L 63/0853* (2013.01); *H04L 63/067* (2013.01)
(58) Field of Classification Search
CPC ............... H04L 63/067; H04L 63/0853; H04L 63/0884; H04L 9/0631; H04L 9/0894;

(Continued)

(56) References Cited

U.S. PATENT DOCUMENTS

2011/0302643 A1* 12/2011 Pichna ................ H04W 12/08
                                                              726/7
2014/0196127 A1*  7/2014 Smeets ............... H04L 63/0884
                                                              726/5

(Continued)

FOREIGN PATENT DOCUMENTS

| JP | 2009-212625 A | 9/2009 |
| JP | 2011-238162 A | 11/2011 |
| JP | 2012-138863 A | 7/2012 |

*Primary Examiner* — Le H Luu
(74) *Attorney, Agent, or Firm* — Finnegan, Henderson, Farabow, Garrett & Dunner, LLP

(57) ABSTRACT

According to an embodiment, a device sends, to an access point device, a network access authentication request issued with respect to a first network. An authentication server device includes a first device-authentication processing unit that, in response to the network access authentication request, performs an authentication operation based on first-type authentication information. The access point device includes a transfer processing unit and a second device-authentication processing unit. When second-type authentication information is not included in the network access authentication request, the transfer processing unit transfers the network access authentication request to the authentication server device. When the second-type authentication information is included in the network access authentication request and when an authentication operation in the access point device is enabled, the second device-authentication processing unit performs an authentication operation based on the second-type authentication information.

10 Claims, 7 Drawing Sheets

(58) Field of Classification Search
CPC ....... H04L 9/30; H04L 9/3215; H04L 9/3218; H04L 9/3247; H04W 12/068; H04W 12/08; H04W 12/35; H04W 12/69
See application file for complete search history.

(56) References Cited

U.S. PATENT DOCUMENTS

| | | | |
|---|---|---|---|
| 2018/0206117 A1* | 7/2018 | Stahl | H04W 12/35 |
| 2019/0158283 A1* | 5/2019 | Kang | H04L 9/30 |
| 2021/0195414 A1* | 6/2021 | Henry | H04L 9/3218 |
| 2021/0203488 A1* | 7/2021 | Ståhl | H04L 9/0631 |
| 2021/0258308 A1* | 8/2021 | Avetisov | H04L 9/3215 |
| 2022/0094546 A1* | 3/2022 | Ying | H04L 9/3247 |
| 2022/0311626 A1* | 9/2022 | Gundavelli | H04L 9/0894 |
| 2022/0321556 A1* | 10/2022 | Gandhi | H04W 12/068 |
| 2023/0156466 A1* | 5/2023 | Shu | H04W 12/69 726/2 |

* cited by examiner

FIG.4

| DEVICE IDENTIFIER | AUTHENTICATION SUCCESS TIMING | TEMPORARY-KEY IDENTIFIER | TEMPORARY KEY | VALIDITY PERIOD |
|---|---|---|---|---|
| A | 5/6/2021 10:00:05 | 100 | 12345678789 | 6/6/2021 10:00:05 |
| B | 12/10/2020 21:30:10 | 1 | 2222222222222 | 1/10/2021 21:30:10 |
| C | 3/18/2021 9:20:31 | 5 | 86868686868 | 4/18/2021 9:20:31 |
| D | 4/30/2021 19:51:22 | 25 | 123123123112 | 5/30/2021 19:51:22 |

| DEVICE IDENTIFIER | COMMON KEY | CONNECTIBLE NETWORK |
|---|---|---|
| A | aaaaaaaaaaaaaa | NETWORK 1 |
| B | bbbbbbbbbbbbbb | NETWORK X |
| C | cccccccccccccc | NETWORK X, NETWORK Y |
| D | dddddddddddddd | NETWORK Z |

AUTHENTICATION SYSTEM USING ACCESS POINT DEVICE AND AUTHENTICATION SERVER TO HANDLE A DEVICE'S NETWORK ACCESS AUTHENTICATION REQUEST

CROSS-REFERENCE TO RELATED APPLICATIONS

This application is based upon and claims the benefit of priority from Japanese Patent Application No. 2021-111430, filed on Jul. 5, 2021; the entire contents of which are incorporated herein by reference.

FIELD

Embodiments described herein generally relate to a communication system, an access point device, a communication method, and a computer program product.

BACKGROUND

A conventional technology is known for which, while the authentication information of devices is managed in an integrated manner using an authentication server device, network access control of the respective local networks is performed. For example, the technology such as IEEE 802.1X or IETF RFC 5191 (PANA: Protocol for Carrying Authentication for Network Access) is conventionally known.

However, in the conventional technology, during the period of time in which the communication with the authentication server device is interrupted, connectibility/non-connectibility of a network with respect to a device cannot be performed.

BRIEF DESCRIPTION OF THE DRAWINGS

FIG. 4 is a diagram illustrating an example of device authentication management information according to the first embodiment;

DETAILED DESCRIPTION

A communication system according to an embodiment includes a device, an access point device, and an authentication server device. The device is connected to the access point device via a first network. The access point device is connected to the authentication server device via a second network. The device sends, to the access point device, a network access authentication request issued with respect to the first network. The authentication server device includes a first device-authentication processing unit that, in response to the network access authentication request, performs an authentication operation based on first-type authentication information. The access point device includes a transfer processing unit and a second device-authentication processing unit. When second-type authentication information is not included in the network access authentication request, the transfer processing unit transfers the network access authentication request to the authentication server device. When the second-type authentication information is included in the network access authentication request and when an authentication operation in the access point device is enabled, the second device-authentication processing unit performs an authentication operation based on the second-type authentication information.

Exemplary embodiments of a communication system, an access point device, a communication method, and a computer program product are described below in detail with reference to the accompanying drawings.

First Embodiment

Firstly, the explanation is given about an exemplary device configuration of a communication system 100 according to a first embodiment.

Exemplary Device Configuration

Figure 1:
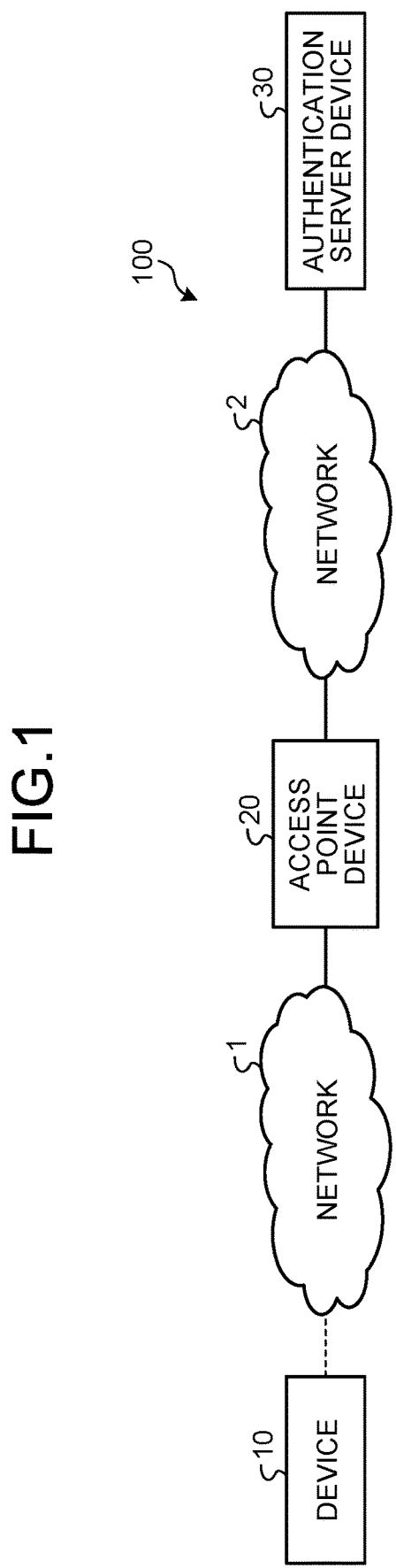
FIG. 1 is a diagram illustrating an exemplary device configuration of a communication system according to a first embodiment.

FIG. 1 is a diagram illustrating an exemplary device configuration of the communication system 100 according to the first embodiment. The communication system 100 according to the first embodiment includes a device 10, an access point device 20, and an authentication server device 30.

The device 10 can be any arbitrary device. For example, the device 10 can be an edge device used in infrastructure services. More particularly, the device 10 can be, for example, a sensor or an IoT device (IoT stands for Internet of Things). Moreover, there can be an arbitrary number of devices 10 in the communication system 100.

The device 10 is in a state not connected to a network 1, but is going to be connected to the network 1 by performing an authentication operation (network access authentication) for connection to the network 1.

The network 1 is a local area network or a field area network. As far as the connection form of the network 1 is concerned, the connection mode can be in a wired manner or a wireless manner. Moreover, there can be an arbitrary communication protocol implemented in the network 1. Examples of the communication protocol implemented in the network 1 include the following: Ethernet (registered trademark), Wi-Fi, LPWA protocol (LPWA stands for Low Power Wide Area), and wireless multihopping.

A network 2 can be of an arbitrary type. For example, the network 2 can be a wide area network such as the Internet. Alternatively, for example, the network 2 can be a closed area network over a wide area. Still alternatively, the network 2 can be a local area network such as an in-house network of a business enterprise. The network 2 has the authentication server device 30 connected thereto. Thus, the access point device 20 and the authentication server device 30 communicate with each other via the network 2.

The access point device 20 is connected to the network 1 as well as the network 2. The access point device 20 is, for example, an aggregation device or a concentrator.

The authentication server device 30 authenticates the device 10. The authentication server device 30 can be implemented in an arbitrary manner. For example, the authentication server device 30 can be implemented using an orthodox server computer. Alternatively, for example, the authentication server device 30 can be implemented using a virtual server that is virtualized using a server virtualization technology. Still alternatively, for example, the authentication function of the authentication server device 30 can be implemented in the form of a cloud service.

Exemplary Functional Configuration of Device

Figure 2:
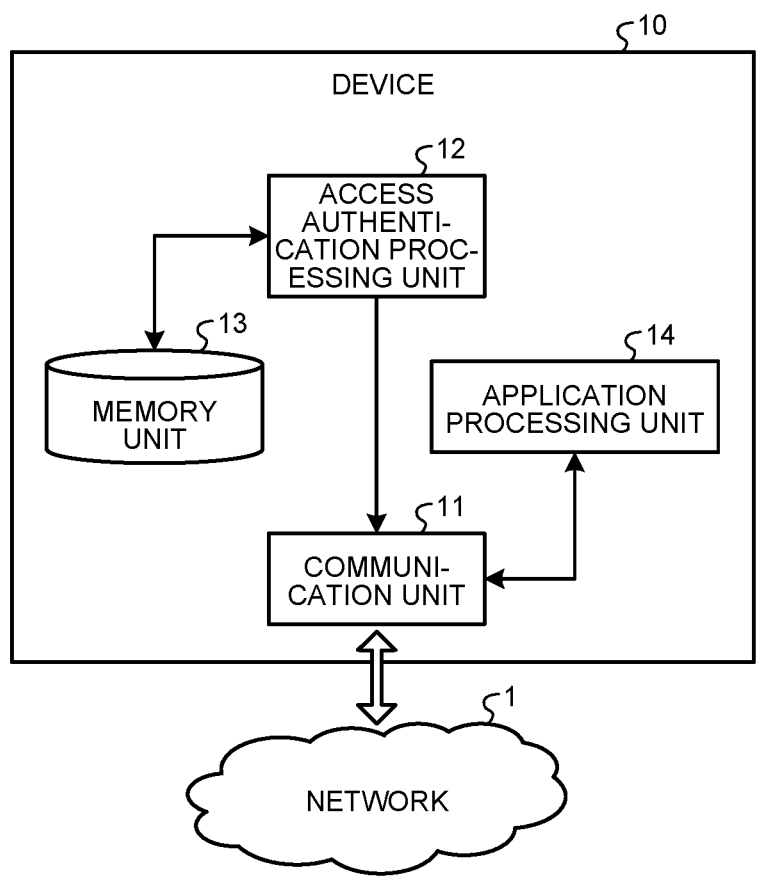
FIG. 2 is a diagram illustrating an exemplary functional configuration of a device according to the first embodiment.

FIG. 2 is a diagram illustrating an exemplary functional configuration of the device 10 according to the first embodiment. The device 10 according to the first embodiment includes a communication unit 11, an access authentication processing unit 12, a memory unit 13, and an application processing unit 14.

The communication unit 11 communicates with the access point device 20 via the network 1.

The access authentication processing unit 12 performs an authentication operation to be connected to the network 1. The authentication operation can be performed in an arbitrary manner. Examples of the authentication operation include IEEE 802.1X, PANA, or Constrained Join Protocol (CoJP). The access authentication processing unit 12 performs a predetermined authentication operation regarding the network 1; and, when the predetermined authentication operation is successful, then the device 10 gets connected to the network 1.

The memory unit 13 is used to store authentication information that is used by the access authentication processing unit 12. The authentication information represents, for example, the identifier of the device 10 and a password. Alternatively, for example, the authentication information represents a pair of a private key and a public key. Still alternatively, the authentication information represents a client certificate (a public key certificate) of the device 10. Still alternatively, the authentication information represents an identifier, a public key, and a public key certificate of either the network 1 or the authentication server device 30 connected to the network 1.

Typically, the authentication information is set at the time of factory shipment of the device 10, or at the time of initialization of the device 10 after installation. Moreover, during the operations of the device 10, the access authentication processing unit 12 updates the authentication information stored in the memory unit 13 or can add to the authentication information stored in the memory unit 13. Meanwhile, in the case of performing the authentication using information stored in a SIM card (SIM stands for Subscriber Identification Module), the memory unit 13 is equipped with the SIM card and a reading function mechanism.

The application processing unit 14 performs application processing of the device 10. After the completion of the connection to the network 1, the application processing unit 14 sends application data to the network 1, and receives application data from the network 1. The application processing includes, for example, obtaining and sending sensor data, controlling an actuator, and transferring messages to other devices 10. After analyzing and processing the obtained data, the application processing unit 14 can send the result to other devices via the network 1.

Exemplary Functional Configuration of Access Point Device

Figure 3:
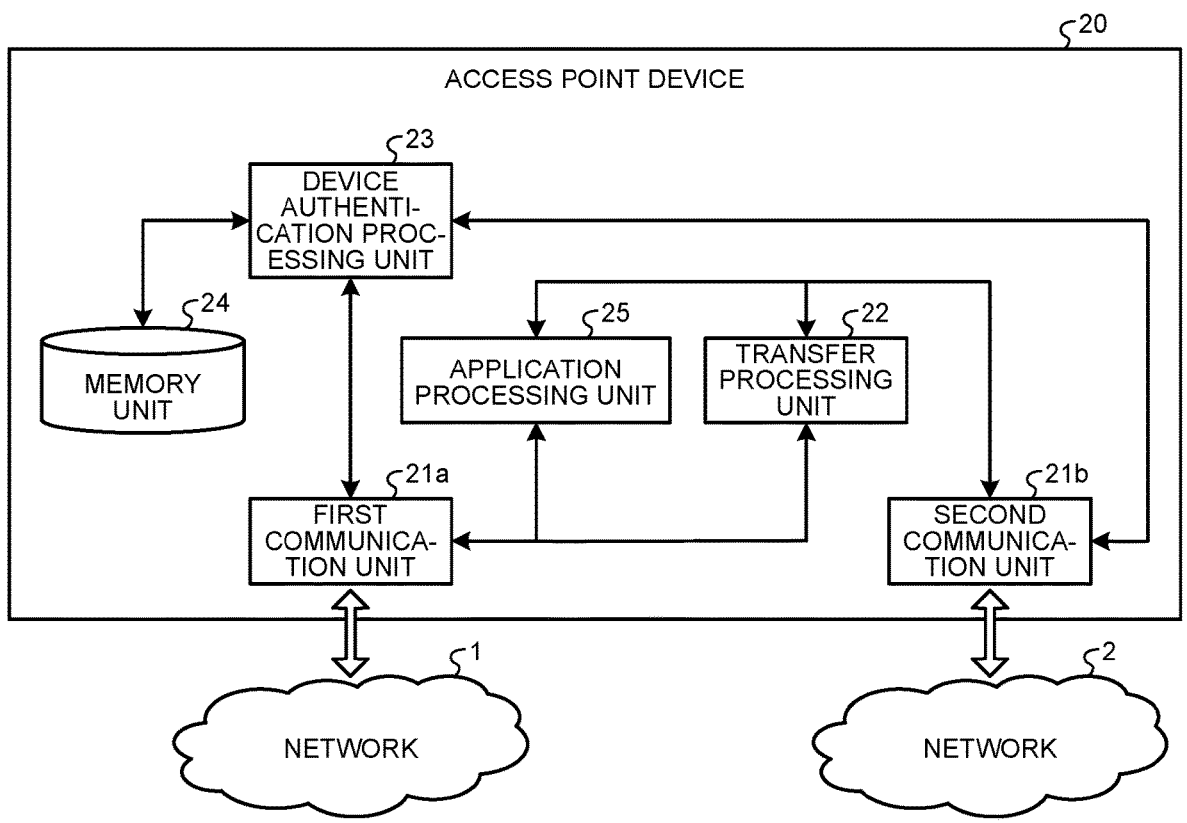
FIG. 3 is a diagram illustrating a functional configuration of an access point device according to the first embodiment.

FIG. 3 is a diagram illustrating a functional configuration of the access point device 20 according to the first embodiment. The access point device 20 according to the first embodiment includes a first communication unit 21a, a second communication unit 21b, a transfer processing unit 22, a device authentication processing unit 23, a memory unit 24, and an application processing unit 25.

The first communication unit 21a communicates with other devices (for example, the device 10) via the network 1. The second communication unit 21b communicates with other devices (for example, the authentication server device 30) via the network 2.

Meanwhile, when the networks 1 and 2 have the same communication protocol, the first communication unit 21a and the second communication unit 21b can be the same unit.

The transfer processing unit 22 transfers data. For example, the transfer processing unit 22 transfers a network access authentication request, which is received from the device 10 via the network 1, to the authentication server device 30 via the network 2. Moreover, the transfer processing unit 22 transfers a network access authentication result response, which is received from the authentication server device 30 via the network 2 and which is addressed to the device 10, to the device 10 via the network 1. Furthermore, for example, the transfer processing unit 22 transfers application data that is communicated between the device 10 and the communication-destination devices of the device 10.

The device authentication processing unit 23 performs the authentication operation for the device 10 that is to be connected to the network 1. Regarding the device 10 that is to be connected to the network 1 for the first time, the authentication is always performed by the authentication server device 30. However, regarding the device 10 for which the authentication is successful at least once by the authentication server device 30, the authentication can be performed by the device authentication processing unit 23.

When the authentication server device 30 performs the authentication operation for the device 10 based on authentication information (first-type authentication information), an authentication result response including the authentication result is notified to the device authentication processing unit 23 via the network 2. According to that notification, the device authentication processing unit 23 determines whether or not the concerned device 10 is authenticated by the authentication server device 30.

When the device 10 is authenticated, the identifier of the authenticated device 10 and authentication information enabling authentication of the device 10 (second-type authentication information) is provided by the authentication server device 30 to the device authentication processing unit 23. This authentication information can be in an arbitrary form. For example, the authentication information (the second-type authentication information) can be a common key (a temporary key) such as a password, or can be a token. In the first embodiment, the explanation is given about the example in which the authentication information (the second-type authentication information) is in the form of a temporary key.

The authentication result and the supplementary information included in the authentication result response received from the authentication server device 30 is generally set to have a validity period. The information included in the authentication result response is stored as device authentication management information in the memory unit 24.

Example of Device Authentication Management Information

FIG. 4 is a diagram illustrating an example of the device authentication management information according to the first embodiment. The device authentication management information according to the first embodiment contains the following items: device identifier, authentication success timing, temporary-key identifier, temporary key, and validity period.

The item "device identifier" represents identification information that enables identification of the concerned device 10. The item "authentication success timing" indicates the timing of successful authentication performed by the authentication server device 30. The item "temporary-key identifier" represents identification information that enables identification of the temporary key. The item "temporary key" represents data indicating the temporary key. The item "validity period" represents the validity period of the temporary key.

Returning to the explanation with reference to FIG. 3, when a network access authentication request is received from the device 10, the device authentication processing unit 23 either can perform the authentication operation as per the request or may not perform the authentication operation. When a network access authentication request is received from the device 10, unless at least the valid authentication information for authenticating the device 10 is not stored in the memory unit 24, the device authentication processing unit 23 cannot perform the authentication operation as per the request. Even if the valid authentication information for authenticating the device 10 is stored in the memory unit 24, in the state in which the access point device 20 is able to communicate with the authentication server device 30, the request can be rejected and the authentication operation can be invariably performed between the device 10 and the authentication server device 30.

On the other hand, in the state in which the access point device 20 is not able to communicate with the authentication server device 30, the device authentication processing unit 23 can authenticate the device 10 according to the network access authentication request received from the device 10. That is, when not connectible to the network 2, the device authentication processing unit 23 can enable the authentication operation in the access point device 20. On the other hand, when connectible to the network 2, the device authentication processing unit 23 can disable the authentication operation in the access point device 20.

The access point device 20 receives application data from the device 10 via the network 1, and can process that application data by itself. In that case, the application processing unit 25 processes the application data. The details of the processing performed by the application processing unit 25 can be arbitrary. The application processing details include, for example, storing the received application data, analyzing the received application data, and transferring the received application data to other devices connected to the network 2. Moreover, in response to a request received from another device connected to the network 1 or the network 2, the application processing unit 25 can send, to the other device, the application data received till that point of time.

Exemplary Functional Configuration of Authentication Server

Figures 5, 6:
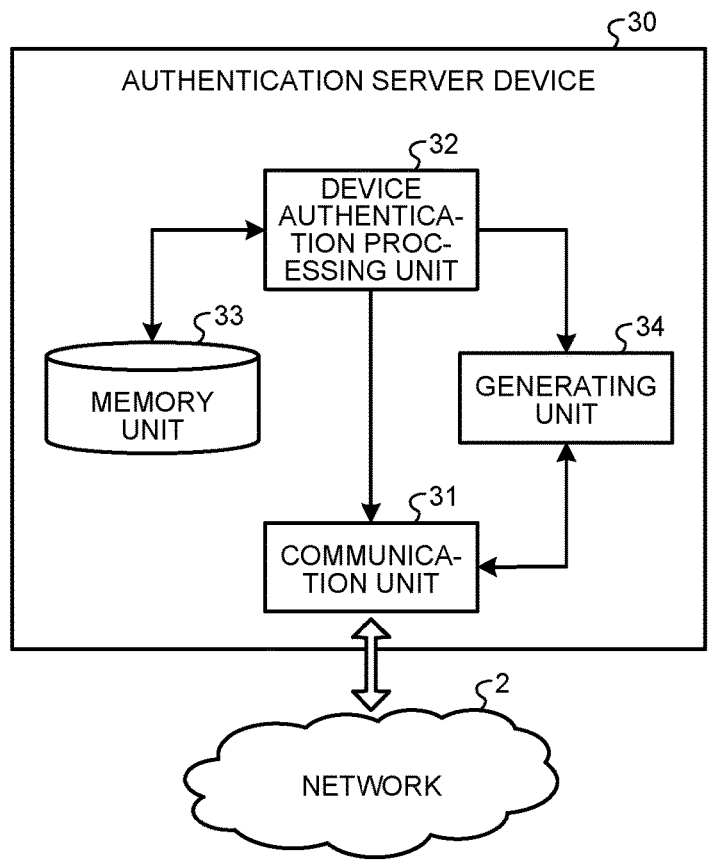
FIG. 5 is a diagram illustrating an exemplary functional configuration of an authentication server device according to the first embodiment.
FIG. 6 is a diagram illustrating an example of device information according to the first embodiment.

FIG. 5 is a diagram illustrating an exemplary functional configuration of the authentication server device 30 according to the first embodiment. The authentication server device 30 according to the first embodiment includes a communication unit 31, a device authentication processing unit 32, a memory unit 33, and a generating unit 34.

The communication unit 31 communicates with the access point device 20 via the network 2.

The device authentication processing unit 32 authenticates the device 10 and determines connectibility/non-connectibility of the device 10 with respect to the network 1. The authentication operation meant for determining connectibility/non-connectibility can be arbitrary. For example, the authentication operation is performed using RADIUS (Remote Authentication Dial In User Service) or using EAP (Extensible Authentication Protocol) performed in Diameter. As far as the specific authentication protocol to be used in the authentication operation is concerned, various authentication protocols are thinkable. In either case, the device authentication processing unit 23 authenticates the device 10 based on the authentication information stored in the memory unit 13 of the device 10.

The memory unit 33 is used to store the device information of the device 10.

Example of Device Information

FIG. 6 is a diagram illustrating an example of the device information according to the first embodiment. The device information according to the first embodiment contains the following items: device identifier, common key, and connectible network.

The item "device identifier" represents the identification information that enables identification of the device 10. The item "common key" represents authentication information to be used by the device authentication processing unit 32 in authenticating the device 10.

The item "connectible network" represents the network to which the device 10 is connectible. Meanwhile, the device information need not contain information indicating the connectible network. As illustrated in the example of the device information in FIG. 6, when the information indicating the connectible network is included, even if the device 10 is successfully authenticated, depending on the network to which the device 10 attempts to be connected, the device authentication processing unit 23 rejects the connection.

Returning to the explanation with reference to FIG. 5, the device authentication processing unit 32 sends the network access authentication result to the access point device 20 via the communication unit 31. Moreover, when the information indicating the connectible network is included in the device information, the device authentication processing unit 32 sends the connectibility/non-connectibility determination result to the access point device 20.

Besides, when the authentication of the device 10 based on the first-type authentication information is successful and when network connection by the device 10 is permitted, then the device authentication processing unit 32 sends the temporary-key information of the device 10 to the access point device 20 of the concerned network. More particularly, the generating unit 34 issues a temporary key as the second-type authentication information and generates temporary-key information containing information about the temporary key, the key identifier, and the validity period. The temporary-key information is sent to the device authentication processing unit 23 of the access point device 20 via the network 2. Then, the device authentication processing unit 23 sends the temporary-key information to the device 10 via the first communication unit 21a.

Meanwhile, the authentication result and the connectibility/non-connectibility determination result of the device 10 can be sent also to the device 10 in addition to sending the results to the access point device 20.

Example of Communication Method

Figure 7:
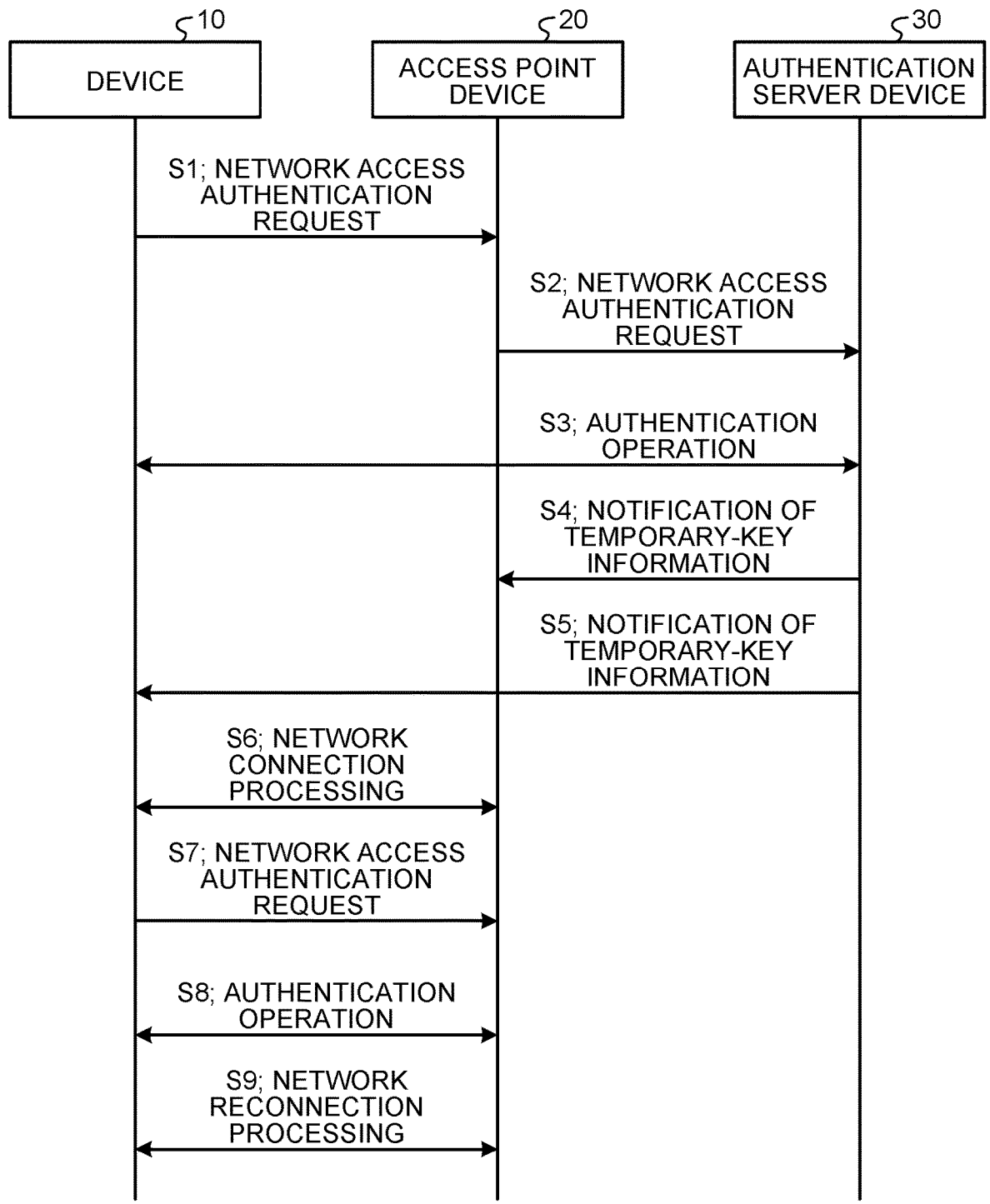
FIG. 7 is a sequence diagram illustrating an example of a communication method according to the first embodiment.

FIG. 7 is a sequence diagram illustrating an example of the communication method according to the first embodiment. Firstly, the device 10 sends a network access authentication request to the access point device 20 via the network 1 (Step S1).

Upon receiving the network access authentication request issued at Step S1, the access point device 20 transfers the network access authentication request to the authentication server device 30 (Step S2).

Then, the device 10 and the authentication server device 30 perform the authentication operation according to a predetermined authentication protocol (Step S3). When the authentication is successful and when the connection to the network 1 by the device 10 is permitted, then the authentication server device 30 notifies temporary-key information (Step S4). In the example illustrated in FIG. 7, the authentication server device 30 sends the temporary-key information to the access point device 20 and the device 10 (Steps S4 and S5).

In the authentication operation performed at Step S3, as a result of receiving a connection permission notification from the authentication server device 30, the device 10 that is permitted to be connected to the network 1 performs a connection operation with respect to the network 1 (Step S6).

Subsequently, the device 10 resends a network access authentication request to the access point device 20 via the network 1 (Step S7). For example, when the validity period of the authentication state of the device 10 expires or when the device 10 is rebooted, then a network access authentication request is resent.

In the case illustrated in FIG. 7, the access point device 20 receives an authentication request at Step S7, and performs the authentication operation between the device 10 and the access point device 20 using the temporary key (Step S8). When the authentication is successful, then the device 10 re-performs the connection operation with respect to the network 1 (Step S9).

Meanwhile, as in the case of Step S8, regarding the method for controlling whether or not the authentication operation is to be performed in the access point device 20, any arbitrary method can be implemented.

For example, based on control information included in the network access authentication request issued by the device 10, it can be determined whether or not the authentication operation is to be performed in the access point device 20. The control information contains, for example, information indicating the present or absence or the temporary key. Because of such control information, the access point device 20 determines whether or not to perform the authentication operation for the device 10 by itself without transferring the network access authentication request to the authentication server device 30.

Moreover, for example, in the case in which the access point device 20 constantly attempts to authenticate the device 10 by itself, when the access point device 20 is not able to authenticate the device 10 or when the authentication of the device 10 in the access point device 20 is not successful, then the access point device 20 can transfer the network access authentication request to the authentication server device 30.

Furthermore, in the case in which the access point device 20 constantly attempts to transfer the network access authentication request to the authentication server device 30, when the network access authentication request cannot be transferred, then the access point device 20 can authenticate the device 10 by itself.

As explained above, the communication system 100 according to the first embodiment includes the device 10, the access point device 20, and the authentication server device 30. The device 10 is connected to the access point device 20 via the network 1 (a first network). The access point device 20 is connected to the authentication server device 30 via the network 2 (a second network). The device 10 sends, to the access point device 20, a network access authentication request issued with respect to the first network. The authentication server device 30 includes the device authentication processing unit 32 (a first device-authentication processing unit) that, in response to the network access authentication request, performs an authentication operation based on the first-type authentication information. When the second-type authentication information is not included in the network access authentication request, the access point device 20 transfers the network access authentication request to the authentication server device 30. On the other hand, when the network access authentication request contains the second-type authentication information and when the authentication operation in the access point device 20 is enabled, the device authentication processing unit 23 (a second device-authentication processing unit) performs the authentication operation based on the second-type authentication information.

Thus, in the communication system 100 according to the first embodiment, even during the period of time in which the communication with the authentication server device 30 is interrupted, the connectibility/non-connectibility of the device 10 with respect to the network 1 can still be determined.

More particularly, for example, in the infrastructure services, it is desirable that the authentication information of the device 10 is managed in an integrated manner in a cloud (in the first embodiment, the authentication server device 30). In a system having such a configuration, when the device 10 is connected to the local network (in the first embodiment, the network 1), the authentication operation is performed between the device 10 and the cloud, and the connectibility/non-connectibility of the device 10 with respect to the local network is determined.

Conventionally, the event of interrupted communication between the local network and the cloud due to a communication failure caused by such as disaster, results in an inability of authenticating the devices present in the local network (in the first embodiment, the devices 10). For that reason, even if the devices in the local network are functioning normally, even the limited services cannot be provided using those devices.

In the communication system 100 according to the first embodiment, while managing the authentication information of the device 10 in an integrated manner in the authentication server device 30, the authentication operation can be performed between the device 10 and the access point device 20 without using the authentication server device 30 as needs dictate.

Second Embodiment

Given below is the explanation of a second embodiment. In the second embodiment, the identical part to the first embodiment is not explained again, and the explanation is given only about the differences with the first embodiment. In the second embodiment, the explanation is given for a case in which the device 10 receives, from the authentication server device 30, a token indicating the permission for connection to the network 1.

In the second embodiment, when the authentication of the device 10 is successful and the connection to the network 1 by the device 10 is permitted, then the authentication server device 30 issues a token instead of issuing a temporary key. The token either can be sent only to the device 10 or can be sent to the device 10 and the access point device 20.

In the token, the fact that the device 10 is permitted to be connected to the network 1 is written along with the valid period for the connection; and a private-key-based signature of the authentication server device 30 is added. During the period of time in which the device 10 is holding a valid token, the token can be used when network access authentication with respect to the network 1 needs to be performed.

For example, regardless of whether or not the device 10 is holding a token, the access point device 20 can ensure that the authentication operation is always performed between the device 10 and the authentication server device 30. Furthermore, token-based authentication of the device 10 can be performed only when unable to communicate between the access point device 20 and the authentication server device 30.

Moreover, for example, when not connectible to the network 2 due to the influence by such as a communication failure; even though the validity of the token expires, as long as token-utilizing authentication is successful within the valid period of the token, connection to the network 1 by the device 10 is permissible. In the case of performing such control, the memory unit 33 of the authentication server device 30 can retain records of the facts about the token-based authentication and the authentication result.

Modification Example of First and Second Embodiments

In the first and second embodiments described above, a temporary key or a token (the second-type authentication information) can be generated by the device authentication processing unit 23 of the access point device 20. That is, when the authentication operation based on the first-type authentication information performed by the authentication server device 30 is successful, the device authentication processing unit 23 can generate the second-type authentication information and send the second-type authentication information to the device 10. In that case, for example, during the connection operation performed by the device 10 with respect to the network 1, the temporary key or the token is provided to the device 10 from the access point device 20.

Third Embodiment

Given below is the explanation of a third embodiment. In the explanation of the third embodiment, the identical part to the first embodiment is not explained again, and the explanation is given only about the differences with the first embodiment. In the third embodiment, the explanation is given for an example in which an application server that performs application processing is connected to the network 2. Herein, the application processing can be arbitrary. For example, the application processing includes analysis or processing of the application data obtained by the device 10.

When connectible to the application server, the second communication unit 21b of the access point device 20 sends the application data, which is received from the device 10 via the network 1, to the application server via the network 2.

When not connectible to the application server via the network 2, then the application processing unit 25 enables the processing of the application data. On the other hand, when connectible to the application server via the network 2, then the application processing unit 25 disables the processing of the application data.

For example, due to the influence by such as a communication failure, when the access point device 20 is not connectible to the network 2 or to an application server connected to the network 2; then, instead of the application server processing the application data, the application processing unit 25 of the access point device 20 processes the application data received from the device 10 for which the authentication operation based on the second-type authentication information is successful. Then, the processed application data is stored in the memory unit 24 of the access point device 20. Then, for example, in response to a request from another device connected to the network 1, the processed application data that is stored in the memory unit 24 is provided to the other device.

Moreover, for example, by the restoration of communication from such as a communication failure, when the connection to the network 2 or to an application server connected to the network 2 is recovered, the application processing unit 25 sends the application data, which is processed during the interrupted period and which is stored in the memory unit 24, to the application server via the network 2.

Lastly, the explanation is given about an exemplary hardware configuration of the device 10, the access point device 20, and the authentication server device 30 according to the first to third embodiments.

Exemplary Hardware Configuration

Figure 8:
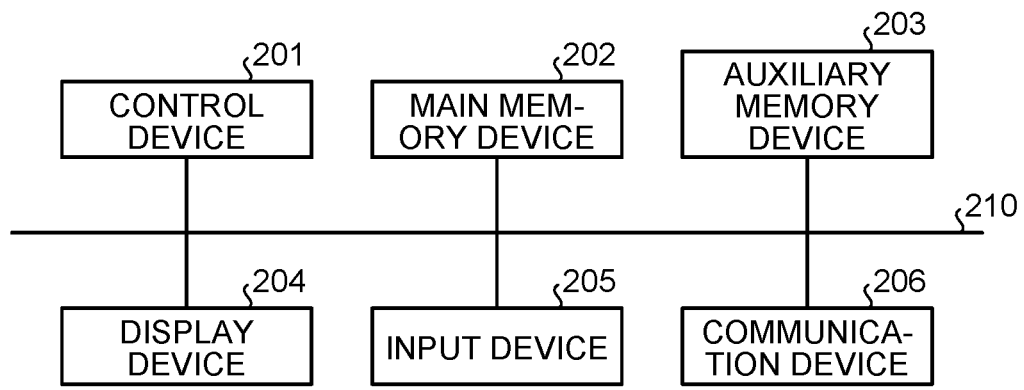
FIG. 8 is a diagram illustrating an exemplary hardware configuration of the main parts of the device, the access point device, and the authentication server device according to the first to third embodiments.

FIG. 8 is a diagram illustrating an exemplary hardware configuration of the main parts of the device 10, the access point device 20, and the authentication server device 30 according to the first to third embodiments. Each of the device 10, the access point device 20, and the authentication server device 30 according to the first to third embodiments includes a control device 201, a main memory device 202, an auxiliary memory device 203, a display device 204, an input device 205, and a communication device 206. The control device 201, the main memory device 202, the auxiliary memory device 203, the display device 204, the input device 205, and the communication device 206 are connected to each other via a bus 210.

Meanwhile, the device 10, the access point device 20, and the authentication server device 30 according to the first to third embodiments need not include some of the configuration explained above. For example, when the device 10 is a sensor provided as a part of an infrastructure service, the display device 204 and the input device 205 are not necessarily provided.

Since the device 10, the access point device 20, and the authentication server device 30 have an identical hardware configuration for the main parts, the following explanation is given only with reference to the access point device 20.

The control device 201 executes computer programs that are read from the auxiliary memory device 203 into the main memory device 202. The main memory device 202 is a memory such as a read only memory (ROM) or a random access memory (RAM). The auxiliary memory device 203 is a hard disk drive (HDD) or a memory card.

The display device 204 is a display such as a liquid crystal display. The input device 205 is an interface for operating the access point device 20. For example, the input device 205 represents buttons installed in the housing of the access point device 20. Alternatively, the display device 204 and the input device 205 can be implemented using a touch-sensitive panel having the display function and the input function.

The communication device 206 is an interface for communicating with other devices. When the networks 1 and 2 have different communication protocols, the communication device 206 includes an interface compatible to the communication protocol of the network 1 and an interface compatible to the communication protocol of the network 2.

The computer programs executed in the device 10, the access point device 20, and the authentication server device 30 are recorded as installable files or executable files in a computer-readable memory medium such as a compact disc read only memory (CD-ROM), a memory card, a compact disc recordable (CD-R), or a digital versatile disc (DVD); and are provided as a computer program product.

Alternatively, the computer programs executed in the device 10, the access point device 20, and the authentication server device 30 can be stored in a downloadable manner in a computer connected to a network such as the Internet. Still alternatively, the computer programs executed in the device 10, the access point device 20, and the authentication server device 30 can be distributed via a network such as the Internet without involving the downloading step.

Still alternatively, the computer programs executed in the device 10, the access point device 20, and the authentication server device 30 can be stored in advance in a ROM.

The computer programs executed in the device 10, the access point device 20, and the authentication server device 30 include modules of the functions, from among the functional configurations illustrated in FIGS. 2, 3, and 5, that are implemented also using computer programs. As far as the actual hardware is concerned, the control device 201 reads the computer programs from a memory medium and executes them, so that the function blocks are loaded into the main memory device 202. That is, the function blocks are generated in the main memory device 202.

Meanwhile, some or all of the functions illustrated in FIGS. 2, 3, and 5 can be implemented using hardware such as an integrated circuit (IC), instead of implementing them using software.

When the functions are implemented using a plurality of processors, each processor either can implement one function or can implement two or more functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
a device;
an access point device; and
an authentication server device, wherein
the device is connected to the access point device via a first network,
the access point device is connected to the authentication server device via a second network,
the device sends, to the access point device, a network access authentication request issued with respect to the first network,
the authentication server device comprises a first device-authentication processing unit that, in response to the network access authentication request, performs an authentication operation based on first-type authentication information, and
the access point device comprises
a transfer processing unit that, when second-type authentication information is not included in the network access authentication request, transfers the network access authentication request to the authentication server device, and
a second device-authentication processing unit that, when the second-type authentication information is included in the network access authentication request and when an authentication operation in the access point device is enabled, performs an authentication operation based on the second-type authentication information.

2. The communication system according to claim 1, wherein the second-type authentication information is either a temporary key having a validity period set therein or a token having a validity period set therein.

3. The communication system according to claim 1, wherein the authentication server device further comprises:
a generating unit that, when the authentication operation based on the first-type authentication information is successful, generates second-type authentication information, and
a communication unit that sends the second-type authentication information to the device and the access point device.

4. The communication system according to claim 1, wherein, when the authentication operation based on the first-type authentication information is successful, the second device-authentication processing unit generates the second-type authentication information and sends the second-type authentication information to the device.

5. The communication system according to claim 1, wherein
when not connectible to the second network, the second device-authentication processing unit enables the authentication operation in the access point device, and
when connectible to the second network, the second device-authentication processing unit disables the authentication operation in the access point device.

6. The communication system according to claim 1, wherein the access point device further comprises an application processing unit that, when not connectible to an application server via the second network, processes application data received from the device for which the authentication operation based on the second-type authentication information is successful.

7. The communication system according to claim 6, wherein
when not connectible to the application server via the second network, the application processing unit enables processing of the application data, and
when connectible to the application server via the second network, the application processing unit disables the processing of the application data.

8. The communication system according to claim 6, wherein, from a state of being not connectible to the application server via the second network, when a state of being connectible to the application server via the second network is restored, the application processing unit sends the application data, which is processed in the application processing unit, to the application server.

9. An access point device that is connected via a second network to an authentication server device which, in response to a network access authentication request issued with respect to a first network, performs an authentication operation based on first-type authentication information, the access point device comprising:
  a transfer processing unit that, when the network access authentication request is received from a device and when second-type authentication information is not included in the network access authentication request, transfers the network access authentication request to the authentication server device; and
  a device authentication processing unit that, when the second-type authentication information is included in the network access authentication request and when an authentication operation in the access point device is enabled, performs an authentication operation based on the second-type authentication information.

10. A computer program product having a non-transitory computer readable medium including programmed instructions, wherein the instructions, when executed by a computer of an access point device connected via a second network to an authentication server device that, in response to a network access authentication request issued with respect to a first network, performs an authentication operation based on first-type authentication information,
  cause the computer to function as:
  a transfer processing unit that, when the network access authentication request is received from a device and when second-type authentication information is not included in the network access authentication request, transfers the network access authentication request to the authentication server device; and
  a device authentication processing unit that, when the second-type authentication information is included in the network access authentication request and when an authentication operation in the access point device is enabled, performs an authentication operation based on the second-type authentication information.

* * * * *